United States Patent Office 3,551,095
Patented Dec. 29, 1970

3,551,095
PRODUCTION OF IRON-FREE CARBONATED HYDROUS ZIRCONIA
Warren B. Blumenthal, North Tonawanda, N.Y., assignor to National Lead Company, New York, N.Y., a corporation of New Jersey
No Drawing. Filed Jan. 2, 1968, Ser. No. 694,892
Int. Cl. C01g 25/00
U.S. Cl. 23—61                                    7 Claims

ABSTRACT OF THE DISCLOSURE

Substantially iron-free carbonated hydrous zirconia (also referred to as zirconium carbonate) is produced by forming a water soluble complex by the reaction of barium zirconate and an alkali bicarbonate in an aqueous medium, recovering the complex in a filtrate, and reducing the pH of the filtrate to 6 to precipitate the product. Carbonated hydrous hafnia is produced by the same procedure from barium hafnate.

BACKGROUND OF THE INVENTION

This invention particularly relates to the preparation of a zirconium oxide product, referred to in the art as zirconium carbonate or carbonated hydrous zirconia. The latter term is considered more accurate since the formula usually ascribed to the product dried at room temperature is $ZrO_2 \cdot xCO_2 \cdot yH_2O$ wherein $x=0.4$ to 0.6 and $y=2$ to 4. It will be seen that the $CO_2:ZrO_2$ mol ratio is always less than 2:1 ratio which would be required for the compound $Zr(CO_3)_2$.

Carbonated hydrous zirconia is used quite extensively in the preparation of other zirconium compounds as well as in compositions for topical application. In both such uses its purity is, of course, important. Although it can be made directly from aqueous solutions of zirconium tetrachloride by precipitation with a soluble carbonate, the iron content of the product is much too high if commercial $ZrCl_4$ is used and a purified grade of $CrCl_4$ is too expensive. Consequently, carbonated hydrous zirconia with a low iron content has hitherto been prepared by:

(1) dissolving $ZrCl_4$ in water to form a solution of zirconyl chloride,
(2) adding $Na_2SO_4$ to the solution,
(3) boiling the mixture to precipitate basic zirconium sulfate,
(4) filtering off the precipitate,
(5) washing the precipitate to remove soluble iron salts and other soluble impurities,
(6) reslurrying the filter cake of basic zirconium sulfate in water,
(7) reacting the slurried basic zirconium sulfate with $Na_2CO_3$ to form carbonated hydrous zirconia,
(8) filtering and repeated washing of the precipitate to remove sodium and sulfate ions.

SUMMARY OF THE INVENTION

The present invention materially simplifies the manufacture of carbonated hydrous zirconia of high purity and reduces the cost thereof.

According to the invention, substantially iron-free carbonated hydrous zirconia or hafnia is made by reacting barium zirconate or hafnate with potassium, sodium, or ammonium bicarbonate in an aqueous medium to form a soluble zirconium complex. Ordinarily, an aqueous solution of the bicarbonate is employed. However, a solution of potassium, sodium or ammonium carbonate may be employed to slurry the barium zirconate, the bicarbonate being formed in solution by addition of carbon dioxide, for example by bubbling $CO_2$ gas into the reaction mixture.

The soluble zirconium or hafnium complex is formed in good yield by the reaction if the pH of the reaction mixture is maintained at about 8.0 to 9.5. After residual unreacted solids are removed by filtration, the pH of the solution is lowered to about 6.0 whereupon all the zirconium or hafnium in solution is converted by hydrolysis to carbonated hydrous zirconia or hafnia, respectively, which is filtered off and washed.

DESCRIPTION OF THE PREFERRED EMBODIMENTS

Example 1

27.7 parts of barium zirconate and 40.1 parts of potassium bicarbonate are added to 70 parts of water and the mixture is heated to 50° C. and maintained at that temperature. As the reaction proceeds, the pH of the mixture tends to rise but is maintained at about 8.5 to 9 by bubbling carbon dioxide into the slurry. When the reaction is completed, the slurry is filtered and the filter cake is washed with water. The wash water is combined with the filtrate and the solution is run into about 100 parts of water which is maintained at a pH of 6 by addition of sulfuric acid to precipitate carbonated hydrous zirconia. The precipitate is filtered off and washed to give a filter cake of carbonated hydrous zirconia which contains about 75% water. The filter cake can be used as it comes from the filter press for most purposes, but if desired may be dried to a water content of about 20%.

In this example, over 90% of the zirconium in the barium zirconate is solubilized and the recovery of zirconium from solution as carbonated hydrous zirconia is quantitative. The product with 20% water contains only 0.05% barium and 5 p.p.m. iron. This contrasts very favorably with carbonated hydrous zirconia ordinarily employed for pharmaceutcal uses in which the iron content is as great as 100 p.p.m.

Example 2

27.7 parts of barium zirconate and 33.6 parts of sodium bicarbonate are added to 70 parts of water and the mixture is heated to 50° C., at which temperature it is held during the reaction, carbon dioxide being bubbled into the reacting slurry to maintain the pH at about 8.5 to 9. Upon completion of the reaction, the slurry is filtered and the filter cake is washed, the wash water being combined with the filtrate and the liquid being added to about 100 parts of water which is maintained at a pH of 6 by addition of sulfuric acid. A precipitate of carbonated hydrous zirconia is formed which is filtered and washed. The product thus obtained contains about 75% water and is suitable for most purposes, although it may be dried down to about 20% water if this is required.

The impurities in the product are of the same order of magnitude as in the product of Example 1.

The following example further illustrates the invention.

Example 3

27.7 parts of barium zirconate are mixed with 47.5 parts of ammonium bicarbonate in 70 parts of water and stirred at ambient (room) temperature. When the reaction is completed the slurry is filtered and the filter cake washed. The combined filtrate and wash water are run into about 100 parts of water maintained at a pH of 6 by addition of sulfuric acid. The precipitated carbonated hydrous zirconia is filtered off and washed to give a filter cake containing about 80% water. As in the preceding examples, the cake may be used as it comes from the filter press for the uses such as making deodorant lotions, but may be dried if desired. The purity of the product is about the same as that of the products of the preceding examples.

It is obvious that the proportions of the reactants may vary and are not important except insofar as the yield of carbonated hydrous zirconia is affected thereby. Operation is feasible if the molar ratio of alkali bicarbonate to barium zirconate is between 3:1 and 6:1. More alkali bicarbonate than the theoretical amount (3:1) required tends to improve the yield, but excessive amounts are troublesome because of the problem of obtaining and maintaining the proper pH. It is preferred to use a molar ratio of approximately 4:1.

During the reaction of the alkali bicarbonate and the barium zirconate the pH of the slurry is maintained at about 8 to 9.5 and preferably between about 8.5 and 9. A pH higher than about 9.5 tends to cause decomposition of the zirconium complex formed with consequent loss of product and a pH much below about 8 tends to reduce yields. When the alkali metal or ammonium is introduced as a hydroxide or carbonate instead of the bicarbonate, $CO_2$ is also introduced to convert the hydroxide or carbonate to bicarbonate.

It will be understood that the acidification of the solution of the zirconium complex to produce hydrolysis may be done with acids other than sulfuric acid. However, sulfuric acid is cheap and is readily washed out of the resultant carbonated hydrous zirconia. As is indicated above, the term "alkali" as used herein includes members of the alkali metal group, i.e. sodium and potassium, as well as ammonium. As with most chemical reactions, that between the barium zirconate and the alkali bicarbonate proceeds more rapidly with increasing temperature. However, there is a tendency at higher temperatures for loss of $CO_2$ from the reaction mixture with consequent raising of the pH. Accordingly, although the reaction may be carried out at either lower or higher temperatures, it is preferred to work at temperatures between nomal ambient temperature (room temperature) and about 50° C. The speed of the reaction is also influenced by the size of the barium zirconate particles employed. As would be expected, fine particles react more rapidly than coarse ones. Although with a particle size of approximately 80μ the reaction rate is usually quite adequate and somewhat larger sized particles may be used, a higher reaction rate is obtained with particles about 45μ or smaller in size.

As mentioned above, the carbonated hydrous zirconia obtained by the process of the present invention is essentially iron-free. It is, therefore, suitable for uses where even the relatively small amount of iron, about 50-60 p.p.m., occurring in high-grade, commercial, carbonated hydrous zirconia is objectionable. The product of the present invention is also quite low in other normal impurities. Consequently, the purity of other zirconium chemicals or products derived therefrom is outstanding.

Since hafnium is always associated, to the extent of a few percent, with zirconium in nature and is separated therefrom only with great difficulty (because the chemical behaviors of zirconium and hafnium are more nearly identical than those of any other two elements), it will be understood that the foregoing examples describe the production of mixtures of carbonated hydrous zirconia and carbonated hydrous hafnia unless, as was not the case, the barium zirconate is free from hafnium. Obviously, the described procedure can be used with suitable raw materials to produce either carbonated hydrous zirconia or carbonated hydrous hafnia in a pure state. In general, except for certain nuclear uses, hafnium is not considered an impurity in zirconium compounds.

Parts and percentages referred to in the foregoing description and the appended claims are parts and percentages by weight.

I claim:

1. A process for producing carbonated hydrous zirconia substantially free from iron which comprises reacting barium zirconate containing iron as an impurity with an aqueous solution of an alkali bicarbonate selected from the group consisting of sodium, potassium, and ammonium bicarbonates to form a soluble zirconium complex, $CO_2$ being introduced into the reactants in such amount as to maintain a pH of 8 to 9.5, filtering off insolubles containing iron, hydrolyzing the soluble zirconium complex in the filtrate by reducing the pH thereof to 6 by addition of acid, and filtering off and washing the carbonated hydrous zirconia thus produced.

2. A process as set forth in claim 1 in which the barium zirconate and alkali bicarbonate are reacted at a pH of 8.5 to 9.

3. A process as set forth in claim 1 in which the molar ratio of alkali bicarbonate to barium zirconate is from about 3:1 to 6:1.

4. A process as set forth in claim 1 in whch the molar ratio of alkali bicarbonate to barium zirconate is about 4:1.

5. A process as set forth in claim 1 in which the reaction is carried out between normal ambient temperature and about 50° C.

6. A process as set forth in claim 1 in which the molar ratio of alkali bicarbonate to barium zirconate is from about 3:1 to 6:1 and they are reacted at a temperature between normal ambient temperature and about 50° C. and at a pH of 8.5 to 9.

7. A process as set forth in claim 1 in which the molar ratio of alkali bicarbonate to barium zirconate is about 4:1, they are reacted at a temperature between normal ambient temperature and about 50° C. and at a pH of 8.5 to 9, and gaseous $CO_2$ is introduced into the mixture of reactants.

References Cited

UNITED STATES PATENTS

| 2,507,128 | 5/1950 | Wainer | 23—61UX |
| 2,930,735 | 3/1960 | Vogel | 23—61X |
| 3,418,073 | 12/1968 | Blumenthal | 23—23 |

OSCAR R. VERTIZ, Primary Examiner

G. T. OZAKI, Assistant Examiner

U.S. Cl. X.R.

23—51